US006116472A

United States Patent [19]

Wanbaugh et al.

[11] Patent Number: 6,116,472

[45] Date of Patent: Sep. 12, 2000

[54] TRIGGER ACUTATED PUMP SPRAYER

[75] Inventors: Linn D. Wanbaugh; Joseph K. Dodd, both of Lee's Summit, Mo.

[73] Assignee: Calmar Inc., City of Industry, Calif.

[21] Appl. No.: 09/210,751

[22] Filed: Dec. 15, 1998

[51] Int. Cl.[7] ........ G01F 11/06

[52] U.S. Cl. ........ 222/340; 222/383.1; 239/333

[58] Field of Search ........ 222/383.1, 382, 222/336, 546, 340; 239/333

[56] References Cited

U.S. PATENT DOCUMENTS

| | | | |
|---|---|---|---|
| 4,361,256 | 11/1982 | Corsette | 222/383.1 |
| 4,527,741 | 7/1985 | Garneau | 222/383.1 |
| 4,624,413 | 11/1986 | Corsette | 222/383.1 |
| 4,669,664 | 6/1987 | Garneau | 222/383.1 |
| 4,728,009 | 3/1988 | Schmidt | 222/383.1 |
| 5,318,206 | 6/1994 | Maas et al. | 222/383.1 |
| 5,749,501 | 5/1998 | Maas et al. | 222/383.1 |

*Primary Examiner*—Andres Kashnikow
*Assistant Examiner*—Christopher S Kim
*Attorney, Agent, or Firm*—Watson Cole Grindle Watson, P.L.L.C.

[57] ABSTRACT

A trigger actuated pump sprayer has a reduced number of parts to render it low cost without compromising any pump function. A combined inlet/discharge valve unit is located in a liquid passageway leading from the inlet end of the pump body. The unit has a pair of axially spaced apart frusto-conical valve skirts diverging outwardly from the common stem on which the valve skirts are provided. The valve skirts straddle a pump chamber port, and the unit may be mounted in place by a dip tube retainer or the retainer may be eliminated with the unit coupled to the pump body itself, fixed in the passageway directly by the dip tube, or made integral with the unit. The trigger actuator has an integral piston return spring, the actuator being fixed to the pump body, and the trigger lever of the actuator being coupled to the pump piston.

18 Claims, 3 Drawing Sheets

TRIGGER ACUTATED PUMP SPRAYER

BACKGROUND OF THE INVENTION

This invention relates generally to a trigger actuated pump sprayer to be mounted via a closure cap to the top of a container of liquid to be sprayed upon manual actuation of a trigger lever. The trigger sprayer typically has an inlet check valve for inletting product into the pump chamber during each suction stroke of the pump piston. An outlet or discharge check valve is likewise provided for valving the discharge orifice closed during each suction stroke and for valving the pressurized product through the discharge during each pump pressure stroke. The inlet valve is located at some suitable location upstream of a port leading into the pump chamber, and the discharge valve is located downstream of the pump chamber port at a location which may be adjacent the pump chamber or at the nozzle end of the sprayer. Rather than separate ports the pump chamber may have a single port with the intake and discharge valves respectively located upstream and downstream thereof.

The intake valve is very often in the form of an inlet ball check valve while the separate and oftentimes distanced discharge valve is in the form of an elastomeric flap valve or an annular valve.

U.S. Pat. No. 4,527,741 discloses a trigger sprayer having an inlet ball check valve and a separate discharge valve in the form of either another ball check valve or an umbrella-like valve, the intake and discharge valve units being located in a passageway extending from the intake passage and communicating with the ported pump chamber. A dip tube retainer is required for supporting both intake and discharge valves and for maintaining them in a relationship which straddles the ported pump chamber.

Moreover, the piston return spring provided for the trigger sprayer may be external to the pump chamber to avoid any non-compatibility problems between the liquid to be sprayed and a metallic spring located within the pump chamber. External piston return metal spring arrangements are known, as well as external piston return plastic spring assemblies. An example of the latter assembly is disclosed in U.S. Pat. No. 5,228,602 in which a separate piston return spring having a flat surface with one end positioned adjacent the back wall of the trigger and its other end positioned rearwardly of the trigger and engaging against the pump body.

The need arises to provide low cost triggers for a variety of applications which by popular demand are increasing. In order to minimize production and assembly costs, the number of parts of the trigger sprayer assembly must be reduced while retaining the basic functions of the pump sprayer. Cost savings relating to elimination of a part or parts of the assembly can, in terms of production and assembly operations, amount to measurable savings in price to the customer.

SUMMARY OF THE INVENTION

It is therefore an object to the present invention to provide a low cost trigger actuated pump sprayer in which the intake and discharge valving is combined into a single molded unit which is easy to mold and assemble and which can be simply mounted in place within the pump sprayer.

The combined inlet and discharge valve unit according to the invention can, alternatively, be molded as separate parts interconnected together allowing the inlet valving to be molded of more pliable material as may be required.

The combined valve unit can be mounted in place by the provision of a dip tube retainer which both suspends the dip tube and which is coupled to the pump body in a manner to support the container closure for mounting the pump sprayer to the container. Otherwise the combined inlet and discharge valve unit can be directly coupled to the pump body for mounting the valving in place, or can be supported by the dip tube itself. In another embodiment the combined valve unit may include an integral dip tube retainer which is coupled directly to the pump body. The combined valve unit may further include a container plug seal coupled to the pump body. With such variants the need for a separate dip tube retainer is eliminated thus saving another part and further reducing the cost of manufacture and assembly.

Both the intake and discharge valves of the valve units according to the invention comprise frusto-conical valves which diverge away from a valve support stem and which sealingly engage the tubular wall of a passageway in which the combined valve is fixed. The inlet and discharge valves are positioned to straddle a port in the tubular wall which communicates with the pump chamber. Thus, during pumping, the peripheral edge of the inlet valve is forced away from the tubular wall by product suctioned up the dip tube and into the port leading to the pump chamber during each piston suction stroke. The peripheral edge of the discharge valve is pressed tightly against the tubular wall during the suction strokes to positively seal the discharge closed. During each pressure stroke, the reverse occurs in that the peripheral edge of the discharge valve is forced away from the cylindrical wall to open a pathway to the discharge orifice, while the peripheral edge of the inlet valve is pressed tightly against the cylindrical wall to seal the inlet closed.

The piston return spring may be formed integrally with the trigger actuator which is coupled to the pump piston for withdrawing the piston out of its pump cylinder bore during each piston return stroke. More specifically the trigger actuator includes a trigger lever coupled to the piston, and a flange engaging the pump body for mounting the trigger actuator in place. The piston return spring comprises a live hinge defined between the trigger lever and the flange of the actuator.

Other objects, advantages and novel features of the invention will become more apparent from the following detailed description of the invention when taken in conjunction with the accompanying drawings.

DETAILED DESCRIPTION OF THE INVENTION

Figure 1:
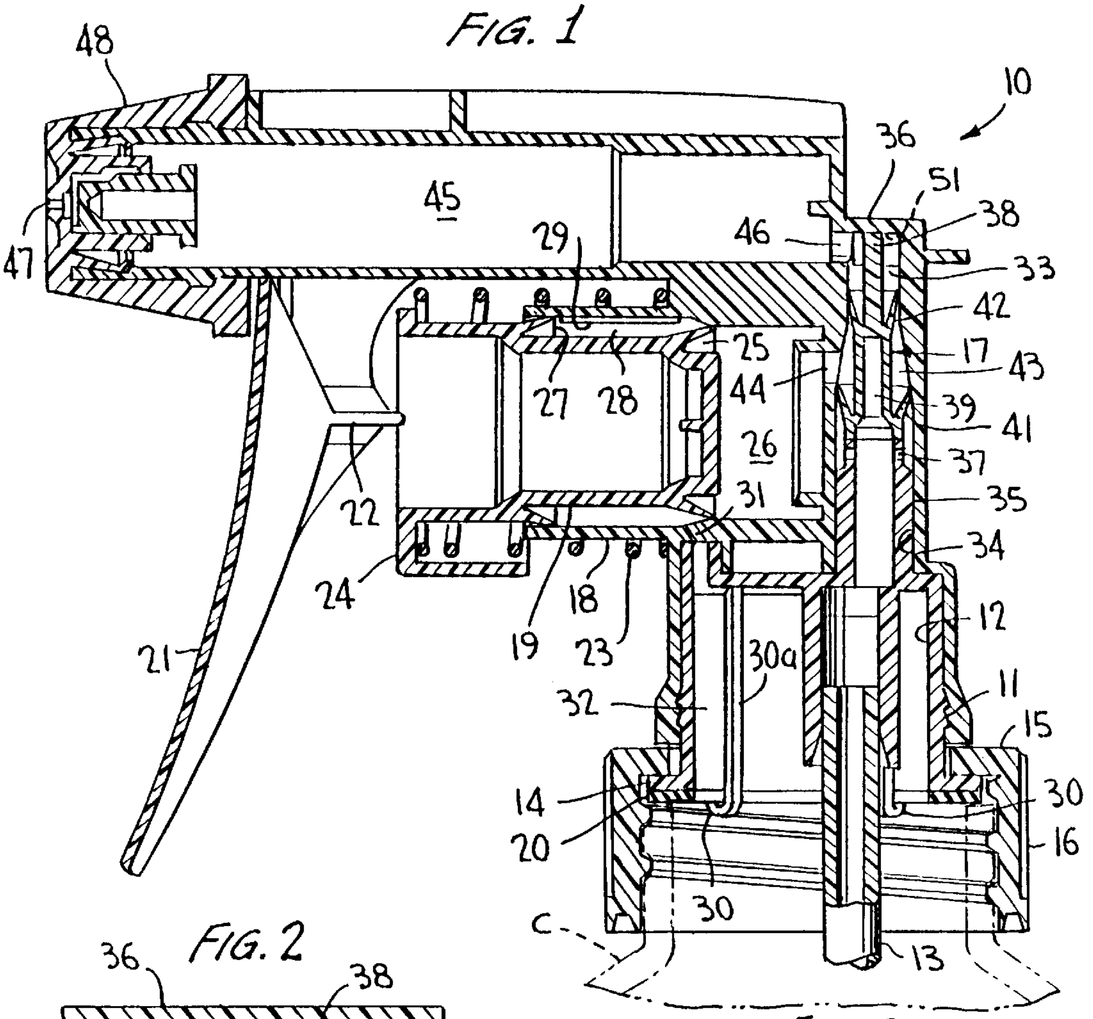
FIG. 1 is a vertical sectional view of the trigger actuated pump sprayer incorporating one embodiment of the invention with the closure gasket and the pump body shroud not shown for clarity.

Turning now to the drawings wherein like reference characters refer to like and corresponding parts throughout the several views, the trigger actuated pump sprayer of the invention is shown in FIG. 1 as comprising a pump body generally designated 10 which may be of a single one-piece plastic molded construction which may be coupled as at 11 to a dip tube retainer 12 which has several functions. For example, the retainer suspends a dip tube 13 which extends into the container (not shown) below the liquid level to provide a passage for liquid suctioned during each pump suction stroke. The retainer has an external flange 14 underlying an internal flange 15 of a container closure 16 for supporting the same on the pump body. The closure cap may be internally threaded for engaging the external threads on the neck (not shown) of the liquid filled container for mounting the trigger sprayer in place, or the cap may beof the FIGS. 4, 7 type capable of being bayonet mounted on the container neck or deformed into engagement with the container neck. In the FIG. 1 embodiment, the tube retainer likewise functions to support the combined inlet and discharge valving unit 17 according to one embodiment of the invention.

A gasket seal 20 bears against the underside of flange 14 and overlies the upper edge of the neck of container C shown in phantom outline in FIG. 1. The gasket is retained in place on tube retainer 12 by bead elements 30 formed by compressing and rolling the lower ends of ribs 30*a* or the like of retainer 12 to underlie the gasket, as described in detail in U.S. Pat. No. 4,454,965.

The pump body includes a generally horizontal pump cylinder 18 in which a hollow and cylindrical pump piston 19 is mounted for reciprocation to therewith define a variable volume pump chamber 26.

A trigger lever 21 is mounted for sliding or pivotal movement on the pump body in any normal manner, and has a projection 22 which engages an outer end of the piston for reciprocating the piston inwardly of its pump bore against the resilient force of a piston return spring 23 which extends between a suitable portion of the pump body and a flange 24 at the outer end of the piston. The piston return spring may be metallic and is external to pump chamber 26 to thereby maintain the spring dry to avoid any contamination or reaction with a given product being dispensed.

The piston has an inboard annular chevron seal 25 in sliding sealing engagement with the wall of the pump cylinder to therewith define the variable volume pump chamber 26. The pump piston likewise has an outboard annular chevron seal 27 defining an annular vent chamber 28 together with the inboard seal. The outboard seal is in a sliding sealing engagement with the wall of the pump cylinder outboard of the pump chamber, and means 29 are provided for breaking that seal during pumping for opening the vent chamber to atmosphere. The wall of the pump cylinder outboard of the pump chamber has a vent port 31 which establishes communication between vent chamber 28 and the interior of the container via a vent path 32 formed in the tube retainer, as disclosed in U.S. Pat. No. 4,747,523 commonly owned herewith. Therefore, during each inward pressure stroke applied to the piston, the container is vented to atmosphere via path 32, port 31, and vent chamber 28 to replenish product discharged from the dispenser with air to thereby avoid hydraulic lock of the piston and container collapse.

The pump body has a first passageway 33 defined by a tubular wall 34. An upper sleeve-like portion 35 of the tube retainer frictionally engages tubular wall 34 and bears directly against valve unit 17 for pressing the upper end of the valve unit against the confronting top wall 36 of passageway 33. The upper end of portion 35 is constricted and has a plurality of transverse flow channels 37.

Valve unit 17 is, in the FIG. 1 embodiment, of a one-piece molded construction having an elongated stem 38 which may have a portion thereof cored out as at 39 to conserve material and to enhance the flexibility of the inlet valve. Also, the upstream end of the stem should have an outer diameter slightly greater than the inner diameter of upper portion 35 of the tube retainer since the stem bears directly on the upper end of portion 35, as shown. The opposing downstream end of stem 38 bears against the underside of top wall 36, such that the tube retainer immobilizes unit 17 in place within first passageway 33.

An inlet valve 41 is provided on stem 38 at an upstream end thereof and a discharge valve 42 is provided on the stem at a predetermined axial distance from the inlet valve to therewith define an annular chamber 43. Each of the valves comprises a frusto-conical skirt diverging from stem 38 in a downstream direction (forming a chevron valve), and each skirt has its outer peripheral edge in sealing engagement with tubular wall 34 which thereby forms a valve seat. Inlet valve skirt 41 may be molded into a larger diameter compared to that of discharge valve skirt 42 to both facilitate ease in molding and to enhance the flexibility of the inlet valve skirt which normally during opening must respond to a small differential in pressure acting on opposite sides of the skirt. And, each of the valves 41, 42 is made of a material having a flexural modulus in the range of 6,000 psi to 50,000 psi, and more specifically in the range of 12,000 to 30,000 psi.

The valve skirts straddle a port 44 which establishes communication between pump chamber 26 and annular chamber 43 and therefore interconnects the pump cylinder with the discharge end of passageway 33 located at the downstream end thereof and with the intake end of the passageway located at the upstream end thereof.

The pump body has an elongated second passageway 45 with an inlet opening 46 at its upstream end in communication with passageway 33. Passageway 45 has a discharge orifice 47 at its downstream end through which liquid product is discharged under pressure during pumping. The discharge orifice is located in a nozzle cap 48 mounted at the end of the pump body for rotation between spray-off and stream-off positions as disclosed in commonly owned U.S. Pat. No. 4,706,888, the entirety of which is incorporated herein by reference.

In operation, assuming that pump chamber 26 is primed, each pressure stroke applied to the piston upon a manual squeezing of the trigger lever reciprocates the piston inwardly of its cylinder 18 and discharges the liquid product under pressure from the pump chamber through port 44, chamber 43 and into passage 45 via opening 46 as the discharge valve skirt is collapsed inwardly toward its stem 38 for opening the discharge permitting product to issue through discharge orifice 47 toward its target. During discharge the pressurized liquid in annular chamber 43 likewise forces the inlet valve skirt into intimate sealing engagement with the confronting tubular wall of passageway 33 to thereby seal the inlet closed. Also, during discharge vent seal 27 is distorted as it engages rib (or ribs) 29 to thereby vent the interior of the container to atmosphere via vent port 31.

Of course rib 29 can be substituted by an equivalent elongated vent groove or grooves, as known in this art.

Upon manual release of the trigger lever, the pump piston is forced outwardly of its cylindrical bore under the action of the return spring whereupon the pump chamber volume is increased thereby creating a sub-atmospheric condition in annular chamber 43 which effects the inletting of liquid from the container up the dip tube through flow channels 37 and into pump chamber 26 through port 44 as the inlet valve skirt 41 is collapsed toward its stem and away from engagement with the tubular wall to open the inlet. The sub-atmospheric condition in chamber 43 at the same time effects an enhanced sealing action of the discharge valve skirt against its confronting tubular wall given the higher atmospheric condition prevailing at the downstream side of the discharge valve. At the end of the piston return stroke vent port 31 is sealed closed as vent seal 27 again sealingly engages a confronting uninterrupted wall of cylinder 18.

Figure 2:
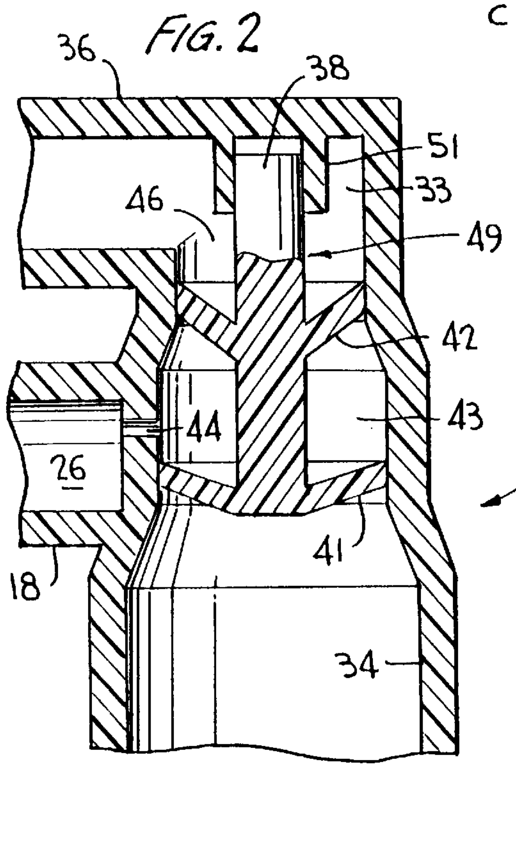
FIG. 2 is a view similar to FIG. 1 at an enlarged scale of part of a trigger sprayer which includes another embodiment according to the invention.

A slightly modified version of an inlet/discharge valve unit designated 49 in FIG. 2 is likewise of a one-piece molded construction which is substantially the same as unit 17 except that the stem does not have a hollow portion, and the unit is mounted in place within passageway 33 without the need for a tube retainer. The downstream end of stem 38 is coupled to a sleeve 51 depending from the confronting top wall 36 of the pump body for fixedly suspending unit 49 in place. As in the FIG. 1 embodiment, valves 41 and 42 straddle port 44 and function in the same manner as aforedescribed to valve product into and out of the pump chamber during pumping operation. Unit 17 of FIG. 1 may be alternatively coupled to the pump body as by a sleeve 51 shown in phantom outline in FIG. 1.

Since the tube retainer together with its various functions is eliminated, the dip tube (not shown) is mounted directly within tubular wall 34 upstream of valve 41. And, a closure cap (not shown) is directly coupled to the lower end of the pump body, as disclosed in U.S. Pat. No. 4,747,523, for mounting the pump sprayer to the container.

Figure 3:
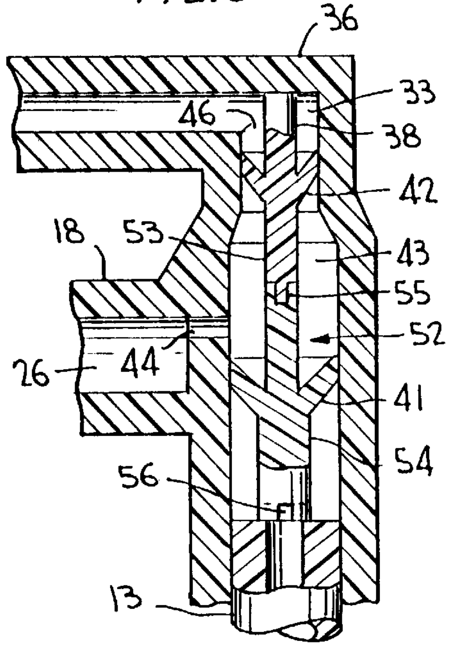
FIG. 3 is a view similar to FIG. 1 of part of a trigger actuated sprayer according to yet another embodiment of the invention.

Another variation of an inlet/discharge valve unit shown at 52 in FIG. 3 is essentially the same as unit 17 in structure and operation, except that unit 52 is molded of separate valve parts 53 and 54 which are snapped or otherwise fitted together as at 55. The valve parts can thus be molded of different materials, one rendering the inlet valve part 54, for example, more compliant compared to that of valve part 53. However, no tube retainer is required for either suspending the dip tube or for fixing the valve unit in place within passageway 33, since the coaxial stems of the valve parts extend between wall 36 and the top end of dip tube 13 which is coupled directly to the tubular wall of passageway 33. The lower end face of the stem of valve part 54 has intersecting open grooves 56 which establish flow channels for the product from the dip tube into passageway 33 during each pump suction stroke.

Figure 4:
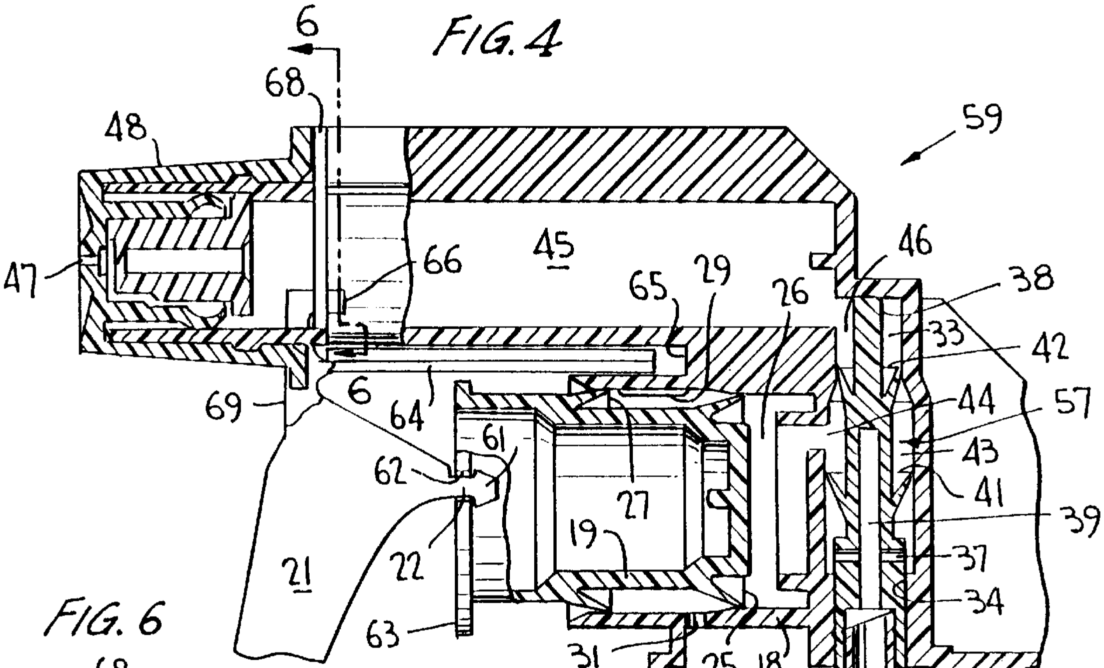
FIG. 4 is a view similar to FIG. 1 of another embodiment according to the invention, the sprayer having an external spring mounted to the pump body.
Figure 4:
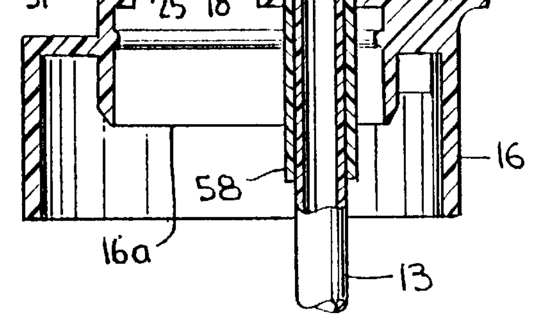

A third embodiment of the inlet/discharge unit is generally designated 57 in FIG. 4 which is similar to valve unit 17 of FIG. 1 except that unit 57 has an integral dip tube retainer 58 coupled directly to tubular wall 34 of first passageway 33 as by a tight frictional fit which thereby fixes the combined valve 57 in place within the pump body. Dip tube 13 is suspended from the integral tube retainer as in any normal manner, and the retainer has one or more transverse flow channels 37 in open communication with valve 41 through which product is inletted from the dip tube and into annular chamber 43 and pump chamber 26 via an open inlet valve 41. A need for a separate tube retainer is thereby eliminated.

The operation of the trigger sprayer of FIG. 4 is essentially the same as that described with reference to FIG. 1.

Pump body 59 according to the FIG. 4 embodiment differs from pump body 10 of FIG. 1 in that not only is the need for a separate tube retainer eliminated but closure cap 16 is integrally formed with pump body 59 thereby avoiding the need for yet another separate part. The integral closure cap can be threaded to the neck of the container using internal threads (not shown), or can be bayonet fitted or snap fitted to the container neck as in any known manner. Cap 16 of FIG. 4 may be provided with an integrally formed container plug seal 16*a* which extends into the neck of a container (not shown) to which the sprayer is mounted. The plug seal functions as in known manner to avoid leakage between the pump sprayer and the container when mounted in place.

The trigger sprayer of FIG. 4 may incorporate another feature of the invention in that the external piston return spring is integral with the trigger actuator. As in FIG. 1 the actuator includes a trigger lever 21 engageable by the fingers of the operator, and a projection 22 except that in this embodiment the projection does not merely bear against the outer end wall of the pump piston. Instead projection 22 of FIG. 4 terminates in barbs 61 or the like for snap fit engagement with mating openings 62 located in a flange 63 on the outer free end of the pump piston. Of course projection 22 may be coupled to the piston in any other known or equivalent manner without departing from the invention.

Figure 5:
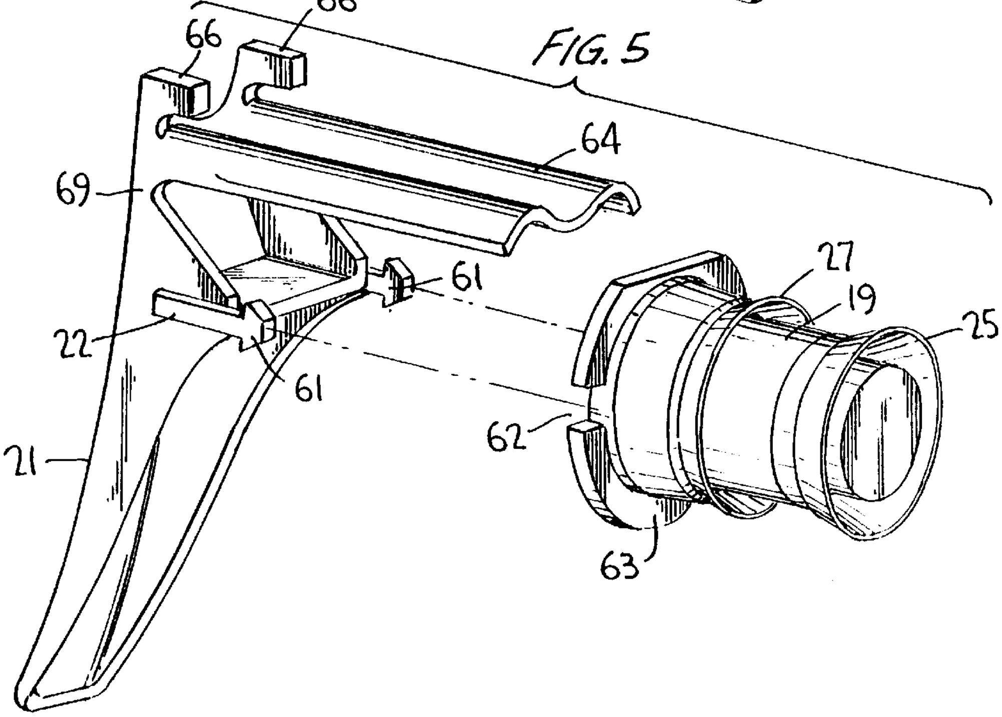
FIG. 5 is an expanded perspective view of the trigger sprayer and pump piston according to FIG. 4.

The trigger actuator further has an integral support flange 64 more clearly detailed in FIG. 5 and extending in an upstream direction for seating within an open slot 65 formed in pump body 59 and opening in a downstream direction. Flange 64 may be undulated in cross-section, as shown in FIG. 5, to facilitate a tight frictional fit when assembled into slot 65 for coupling the trigger actuator to the pump body.

Figure 6:
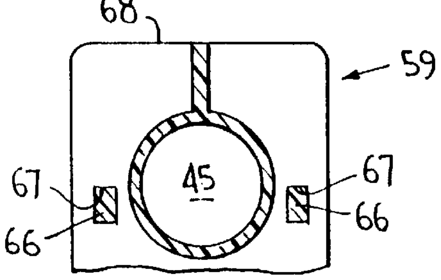
FIG. 6 is a view taken substantially along the line 6—6 of FIG. 4.

The trigger actuator likewise has at least one hook like projection 66 (a pair of such projections being shown in FIGS. 4 to 6) likewise extending in an upstream direction substantially parallel to flange 64 and projecting into mating openings 67 provided in a forward wall 68 of the pump body, as most clearly shown in FIG. 6.

The trigger actuator, which may comprise a one-piece molded plastic part, is constricted in an area between its support flange 64 and its lever 21 which, as shown in FIGS. 4 and 5, defines a live hinge at 69 which thereby renders the trigger lever resilient.

During trigger actuation the trigger actuator remains fixedly mounted on the pump body without any shifting movement as projection 22 depresses the pump piston inwardly of its cylinder bore during each manual squeeze on the trigger. The trigger lever is spring-biased to effect movement of the piston outwardly of its cylinder bore during each piston return stroke as barbs 61 are coupled to flange 63 of the piston for effectively pulling the piston out of its bore. During such trigger lever actuation the lever pivots about the pump body at live hinge 69, and projections 66 prevent a live hinge from shifting relative to the pump body during trigger actuation.

Figure 7:
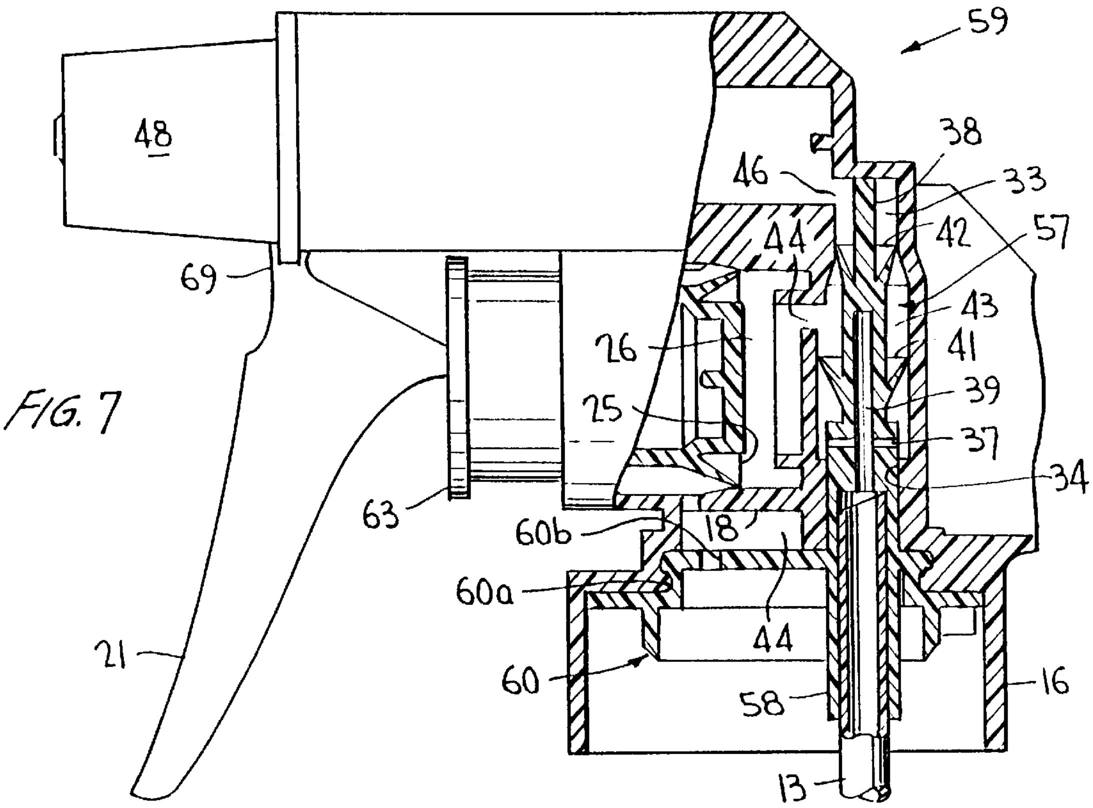
FIG. 7 is a view similar to FIG. 4 of another embodiment of the invention.
Figure 8:
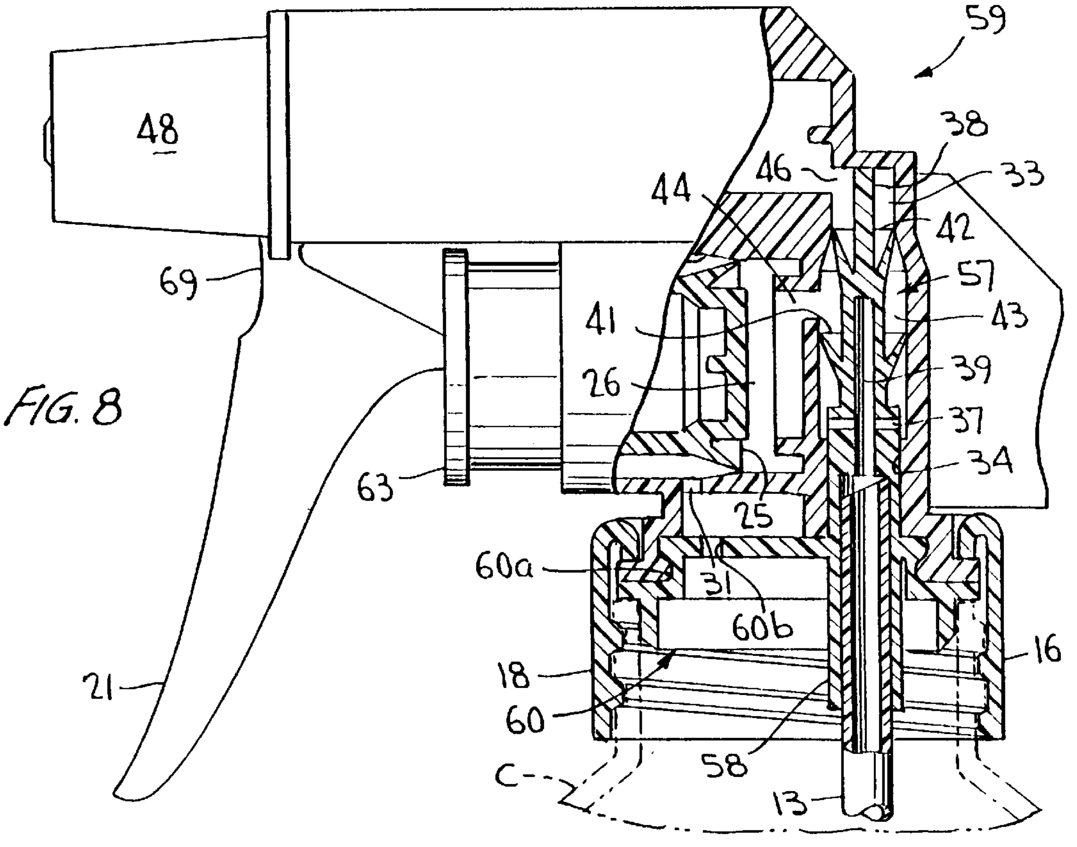
FIG. 8 is a view similar to FIG. 7 but with a different container closure.

The pump sprayers of FIGS. 7 and 8 are similar to that of FIG. 4 except that the inlet/discharge valve unit 57 includes an integral plug seal 60 which extends into the neck of container C as in FIG. 8 for avoiding leakage between the sprayer and the container. Unit 57 may be simply coupled to the pump body by snap fit engagement as at 60*a* shown in FIGS. 7 and 8 for mounting or enhancing the mounting of the unit in place. Forming the plug seal integrally with the valve unit may simplify the molding process for the pump body of especially the FIG. 4 embodiment. As shown seal 60 is provided with a vent port 60*b* for establishing communication between port 31 and the interior of the container.

The closures cap 16 of FIG. 7 is otherwise the same as that shown in FIG. 4, and cap 16 of FIG. 8 is standard internally threaded part.

From the foregoing it can be seen that a low cost trigger sprayer has been devised as having a minimum number of parts without compromising any essential function in a manner which is simple, economical, easy to mold and assemble yet highly effective. The combined inlet/discharge valve unit according to the several embodiments may be of a one-piece molded construction thereby eliminating the need for a separate part while providing improved valving during the intake and discharge pumping operations of the sprayer. The dip tube retainer can be entirely eliminated or can be made integral with the valve unit thereby saving another part and still further producing significant savings in material and labor. Moreover, the container plug seal can be integrally formed with the valve unit for simplifying the manufacture and assembly of sprayers according to the invention.

The trigger actuator according to one embodiment has an integral piston return spring which saves yet another part while at the same time providing an easily installed actuator which may be of a one-piece mold construction snapped into place for coupling it to the pump body as well as to the pump piston. Moreover the closure cap for mounting the trigger sprayer to a container of product to be sprayed can be molded integrally with the pump body, thus saving yet another part.

Obviously, many modifications and variations of the present invention are made possible in the light of the above teachings. It is therefore to be understood that within the scope of the appended claims the invention may be practiced otherwise than as specifically described.

What is claimed is:

1. A trigger actuated pump sprayer comprising, a pump body having an elongated first passageway and an intersecting elongated second passageway, said second passageway having an inlet opening at an upstream end and a discharge orifice at a downstream end through which liquid product is discharged upon pump operation, said first passageway having a discharge end in communication with said inlet opening and an intake end in communication with the interior of a container of the liquid product to be discharged, said first passageway having an open upstream end and having a tubular wall with a port interconnecting a pump cylinder with said discharge end and said intake end, an elongated combined inlet and discharge stationary valve unit within said first passageway, said valve unit being mounted within said pump body and comprising stem means having integral one-way inlet and discharge valves thereon, said valves being axially spaced apart to define an annular chamber therebetween, said valves being located on opposite sides of said pump cylinder port in sealing engagement with said tubular wall, and each of said valves comprising a frusto-conical skirt diverging from said stem means in a downstream direction, each of said skirts having an outer peripheral edge in said sealing engagement, said first passageway being sized for insertion without obstruction of said valve unit through said upstream end into said first passageway, a hollow pump piston mounted in said pump cylinder to therewith define a variable volume pump chamber, a piston return spring for spring biasing said piston outwardly of said pump cylinder, and a trigger actuator movably mounted on said body, said actuator engaging said outer end of said piston for pressure stroking said piston upon a manual squeeze of said actuator whereupon liquid product flows out of said pump chamber into said annular chamber via said port for forcing said inlet valve closed and for collapsing said discharge valve to open, a relaxation of the manual squeeze applied to said actuator effecting a suction stroke of said piston under the action of said spring creating a sub-atmospheric condition in said pump chamber and said annular chamber whereupon liquid product is drawn from the container into said pump chamber via said annular chamber and said port as said inlet valve is collapsed and said outlet valve is forced closed.

2. The pump sprayer according to claim 1, wherein said valve unit further comprises a dip retainer coupled to said pump body, said retainer suspending a dip tube extending into the interior of the container.

3. The pump sprayer according to claim 1, wherein said stem means of said valve unit comprises a stem, coupling means on said pump body at a location downstream of said discharge valve, said stem being coupled to said coupling means for mounting said valve unit to said pump body.

4. The pump sprayer according to claim 1, further comprising a dip tube coupled directly to said tubular wall in axial alignment with said valve unit, said stem means extending between a terminal end of said dip tube and an opposing end wall of said first passageway to be thereby fixed within said first passageway.

5. The pump sprayer according to claim 1, wherein said piston has an inboard annular piston seal in sliding sealing engagement with a wall of said pump chamber, said piston further having an outboard annular seal axially spaced from said piston seal in sliding engagement with said cylinder wall and defining an annular vent chamber with said piston seal, a vent port in said cylinder outboard of said pump chamber for establishing communication between said vent chamber and the interior of the container, and an inner wall of said cylinder having means with which said annular seal cooperates for opening said vent chamber to atmosphere during pumping.

6. The pump sprayer according to claim 1, wherein said valve unit has an integral dip tube retainer coupled directly to said tubular wall for fixing said valve unit within said first passageway.

7. The pump sprayer according to claim 6, wherein said integral dip tube retainer has a hollow wall with at least one opening establishing an inlet passage to said inlet valve from a dip tube suspended from the retainer.

8. The pump sprayer according to claim 1, wherein said valves comprise material having a flexural modulus in the range of 6000 psi to 50,000 psi.

9. The pump sprayer according to claim 8, wherein said flexural modulus is in the range of 12,000 psi to 30,000 psi.

10. The pump sprayer according to claim 1, wherein said stem means of said valve unit comprises a stem, coupling means on said pump body at a location downstream of said discharge valve, said stem being coupled to said coupling means for mounting said valve unit to said pump body.

11. The pump sprayer according to claim 2, wherein said valve unit still further comprises a container plug seal located within a container closure coupled to said pump body.

12. The pump sprayer according to claim 6, wherein said valve unit still further comprises a container plug seal located within a container closure coupled to said pump body.

13. The pump sprayer according to claim 7, wherein said valve unit still further comprises a container plug seal located within a container closure coupled to said pump body.

14. A trigger actuated pump sprayer, comprising a pump body, an inlet passage leading to a pump cylinder, and a discharge passage leading away from the pump cylinder and terminating in a discharge orifice, a pump piston reciprocable in said cylinder for therewith defining a variable volume pump chamber, a trigger actuator mounted on said pump body for pressure stroking said piston inwardly of said cylinder, means biasing said piston for return movement outwardly of said cylinder, said biasing means comprising a piston return spring formed integrally with said trigger actuator, and said actuator being coupled to said piston for effecting the return movement.

15. The pump sprayer according to claim 14, wherein said spring comprises a live hinge defined between a trigger lever and a flange of said actuator, said flange engaging said pump body for mounting said actuator in place.

16. The pump sprayer according to claim 14, wherein said spring comprises a live hinge defined between a trigger lever and a flange of said actuator, and said actuator having attachment means adjacent said hinge in engagement with said pump body for preventing any shifting movement of said hinge upon actuation of said trigger.

17. The pump sprayer according to claim 16, wherein said flange is coupled to said pump body for further mounting said actuator in place.

18. The pump sprayer according to claim 16, wherein attachment means comprises at least one projection extending through an opening in a wall of said pump body.

* * * * *